UNITED STATES PATENT OFFICE.

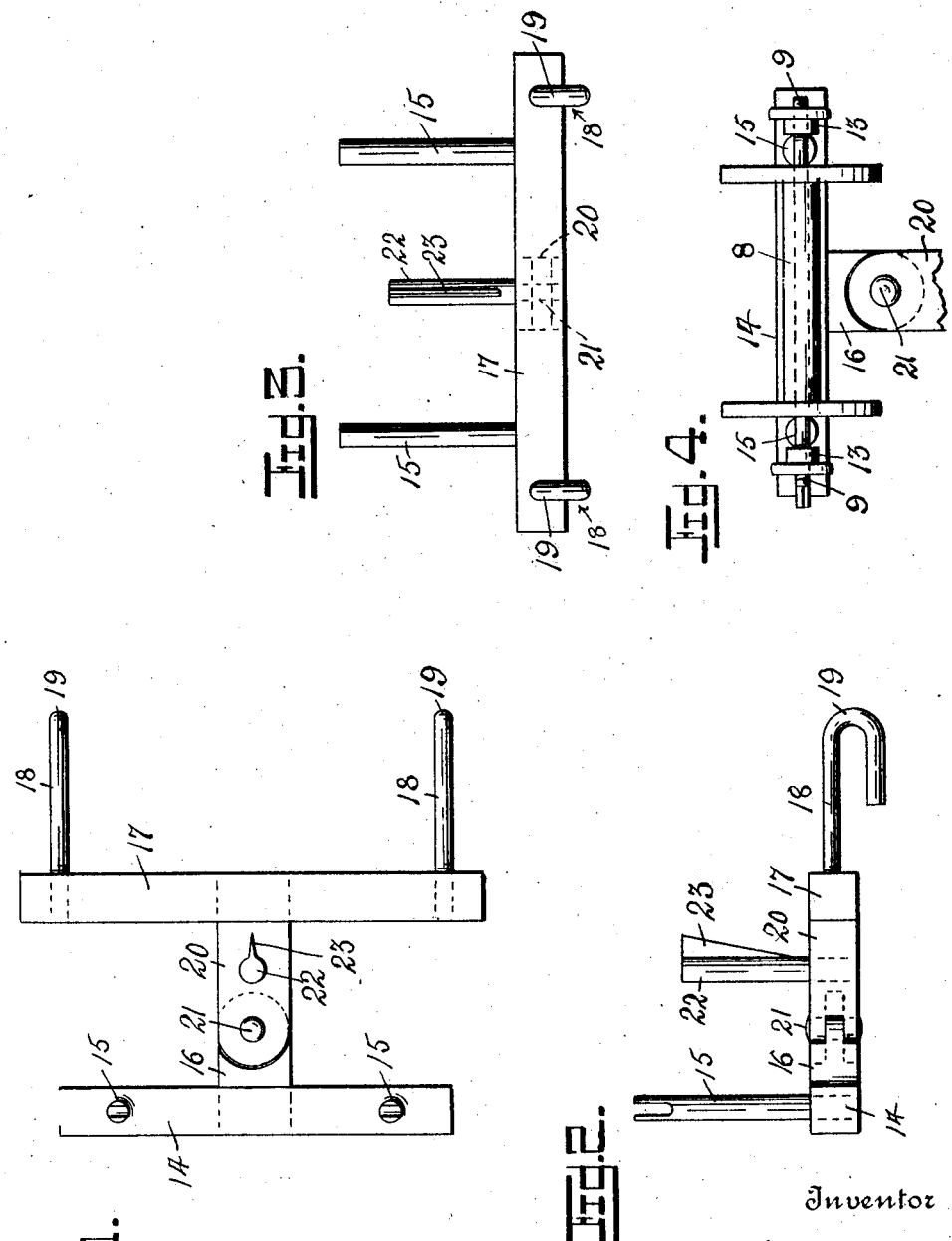

CHARLES REESE THOMAS, OF MUSKOGEE, OKLAHOMA.

TWINE WINDER AND HOLDER.

1,329,442.   Specification of Letters Patent.   Patented Feb. 3, 1920.

Application filed May 18, 1917. Serial No. 169,596.

*To all whom it may concern:*

Be it known that I, CHARLES REESE THOMAS, a citizen of the United States, residing at Muskogee, in the county of Muskogee and State of Oklahoma, have invented a new Twine Winder and Holder, of which the following are specifications.

This invention relates to cord and twine reeling and holding devices and it is the dominant object of the invention to provide a device whereby the reeling or winding of used cord or twine upon a spool may be accomplished in an effective and rapid manner and then supported in a way to allow the unreeling of the same, free from tangles or knots for re-use.

It is a more specific object of the invention to provide a device of the character mentioned particularly adapted for use in the postal service, wherein it is essential that the various bundling operations be accomplished in an efficient manner as well as in a minimum amount of time; the reeling element of the device adapted to be connected with the drive means of a machine, such as a stamp canceling machine or the like, whereby the spool will be rotated at a high velocity for winding the used cord or twine thereon.

The foregoing together with additional advantageous details and arrangement of parts of the preferred embodiment of my invention will be clear from the specific description hereinafter contained when read in connection with the accompanying drawings forming a part thereof and wherein said embodiment of the invention is illustrated for the purpose of facilitating a full understanding of the present improvements.

In the drawings:

Figure 1 is a top plan view of the twine reeling or winding element of the invention.

Fig. 2 is an end elevation.

Fig. 3 is a front elevation.

Fig. 4 is a plan view of a portion of the structure shown in Fig. 1 with the winding spool mounted thereon.

The cord or twine holding element includes a frame comprising a base 14 having bearing pillars 15 arranged adjacent its opposite ends and a tongue 16 secured to the intermediate portion of the base. To permit the frame of the cord or twine holding element to be readily engaged with and supported upon a suitable object, a bracket 17 is provided and carries right angularly disposed spring engaging arms 18, the free ends of which are bent upon themselves or hooked as at 19. The base 17 of the said bracket is provided with a tongue 20 having its outer end bifurcated whereby the tongue 16 may be received between the said bifurcated end and secured thereto by means of a pivot pin 21 passing through openings formed in the bifurcated end and a suitable opening formed in the tongue 16.

Arranged on the tongue 20 is a vertically disposed pintle 22 carrying a blade 23 the cutting edge of which is beveled as clearly shown in the Fig. 2.

Due to the provision of the spring bracket arms 18, it will be readily understood that the cord or twine holding element of the device may be quickly and effectively secured to a suitable support and when in position thereon will serve as means for rotatably supporting the cord or twine carrying spool 8, the said spool having been previously supplied with the cord or twine.

In operation, the spool 8 being supplied with a cord or twine is disposed by its spindle 9 in the notches or seats in the posts 15, the spindle being threaded at the ends to receive clamp nuts 13 to hold the spool in position. At one end the spindle is formed square or other form than round to receive a winding element such as a crank, pulley or the like, not shown as they form no part of the present invention. The cord may then be readily withdrawn as required. Due to the pivotal connection between the frame and bracket of the holding element, it is evident that the frame may be so attached as to permit the cord to be freely unwound therefrom, irrespective of the arrangement or positioning of the bundle about which the same is to be passed. When the proper length of cord has been removed from the spool, the strand may be engaged with the cutting edge of the blade 23 and severed.

With my improved cord or twine holding device, I am enabled to re-use cord or twine arranging the same in a manner to prevent knotting or tangling thereof and allowing the same to be rapidly removed as desired, hence effecting a material saving.

Manifestly, the construction shown is capable of considerable modification, and such modification as is within the scope of my claim, I consider within the spirit of my invention.

I claim:

In a device of the character described, a frame including a base, bearing pillars near the ends of the base and arranged vertically thereon for rotatably supporting a spool, a tongue projecting from one side of the base medially of the ends thereof, a bracket including a base, a tongue extending from the base of the bracket, means for pivotally connecting the outer ends of the tongues together to permit of relative horizontal swinging movement between the frame and the bracket, attaching arms projecting from the base of the bracket, a vertically disposed pintle on the tongue of the bracket, and a cutting blade carried by the pintle.

CHARLES REESE THOMAS.